(12) United States Patent
Honikel et al.

(10) Patent No.: US 8,044,840 B2
(45) Date of Patent: Oct. 25, 2011

(54) METHOD FOR SURVEILLANCE OF SPACE/AIR SPACE

(75) Inventors: Marc Honikel, Uetikon (CH); Hanspeter Berger, Höri (CH)

(73) Assignee: Rheinmetall Air Defence AG, Zurich (CH)

( * ) Notice: Subject to any disclaimer, the term of this patent is extended or adjusted under 35 U.S.C. 154(b) by 396 days.

(21) Appl. No.: 11/991,288

(22) PCT Filed: Jul. 20, 2006

(86) PCT No.: PCT/EP2006/007127
§ 371 (c)(1),
(2), (4) Date: Feb. 29, 2008

(87) PCT Pub. No.: WO2007/028454
PCT Pub. Date: Mar. 15, 2007

(65) Prior Publication Data
US 2010/0007544 A1    Jan. 14, 2010

(30) Foreign Application Priority Data
Sep. 2, 2005 (DE) .......................... 10 2005 041 705

(51) Int. Cl.
*G01S 13/87* (2006.01)

(52) U.S. Cl. ........................................ 342/59; 367/129

(58) Field of Classification Search .................... 342/59; 367/129
See application file for complete search history.

(56) References Cited

U.S. PATENT DOCUMENTS

| | | | |
|---|---|---|---|
| 4,780,719 A | 10/1988 | Frei et al. | |
| 5,448,243 A | 9/1995 | Bethke et al. | |
| 5,794,173 A | 8/1998 | Schuette | |
| 6,002,358 A | 12/1999 | Tsang et al. | |
| 6,338,011 B1 | 1/2002 | Furst et al. | |
| 7,170,820 B2 * | 1/2007 | Szajnowski | 367/127 |

FOREIGN PATENT DOCUMENTS

| | | |
|---|---|---|
| CA | 2063003 | 9/1992 |
| DE | 1057788 | 5/1959 |
| DE | 977646 | 11/1967 |
| DE | 3637129 | 5/1988 |

(Continued)

*Primary Examiner* — Ian Lobo
(74) *Attorney, Agent, or Firm* — Lucas & Mercanti, LLP; Klaus P. Stoffel

(57) ABSTRACT

The invention proposes utilizing the known geometry of the measurements in order to assign them to one another and to resolve ambiguities, wherein the 3D position of an object (3) in space is determined by a spatial section at the same time. This is done using a plurality (N) of sensors (A, B, C) and their geometries (10, 11, 12), wherein a first sensor (A) is part of the master sensor and a space curve (A1) is calculated and then transmitted to the geometry (11) of a sensor (B) which is defined as a slave sensor and whose local geometry (11) is taken into account, a further sensor (C) is then defined as a slave in which the space curves (B1-B3) of the correspondence obtained in the preceding step are calculated and transmitted to the geometry (12) of the new slave sensor (C) together with the master curve (A1), wherein the steps are repeated at least until the last (N) remaining sensor is defined as a slave in a last step (N−1) and the master (A1) and all of its associated measurements of the previous slave sensors (B, C) are transmitted to the local geometry of the last (N) slave sensor and compared with the measurements.

7 Claims, 4 Drawing Sheets

FOREIGN PATENT DOCUMENTS

Figures 3, 4:
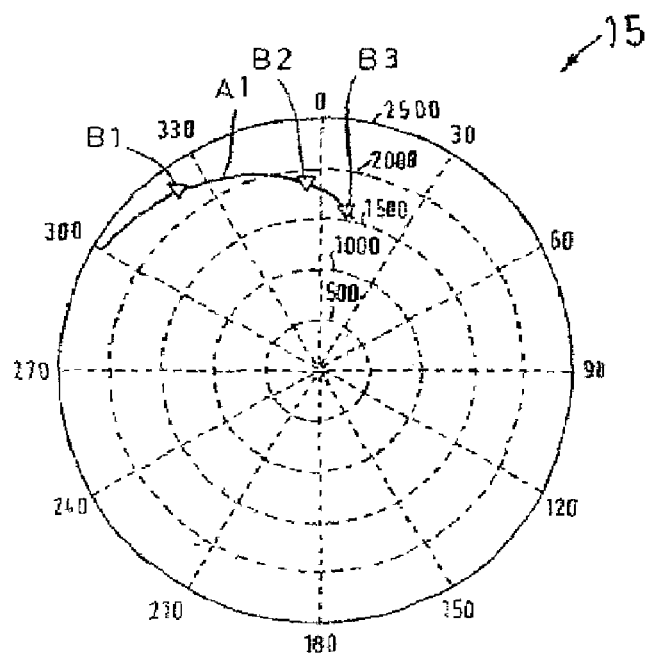

| | | |
|---|---|---|
| DE | 3926216 | 2/1991 |
| DE | 4109981 | 10/1992 |
| DE | 3688935 | 4/1994 |
| DE | 4439742 | 3/1996 |
| DE | 19856231 | 6/2000 |
| DE | 10032433 | 1/2002 |
| EP | 0205794 | 12/1986 |
| EP | 0233982 | 9/1987 |

\* cited by examiner

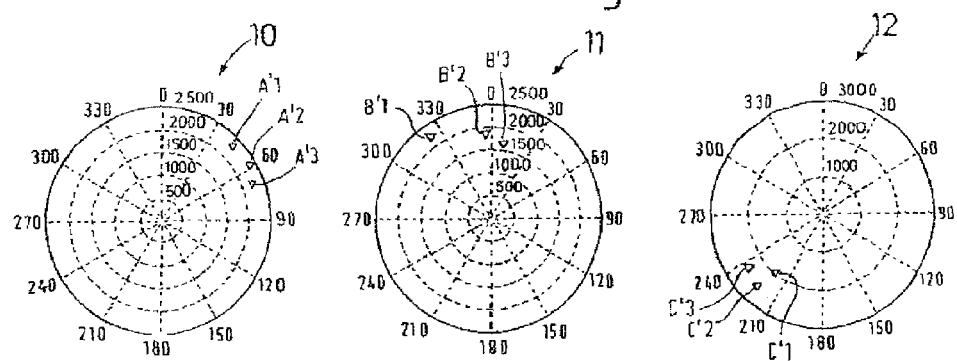
Prior Art  Fig.1
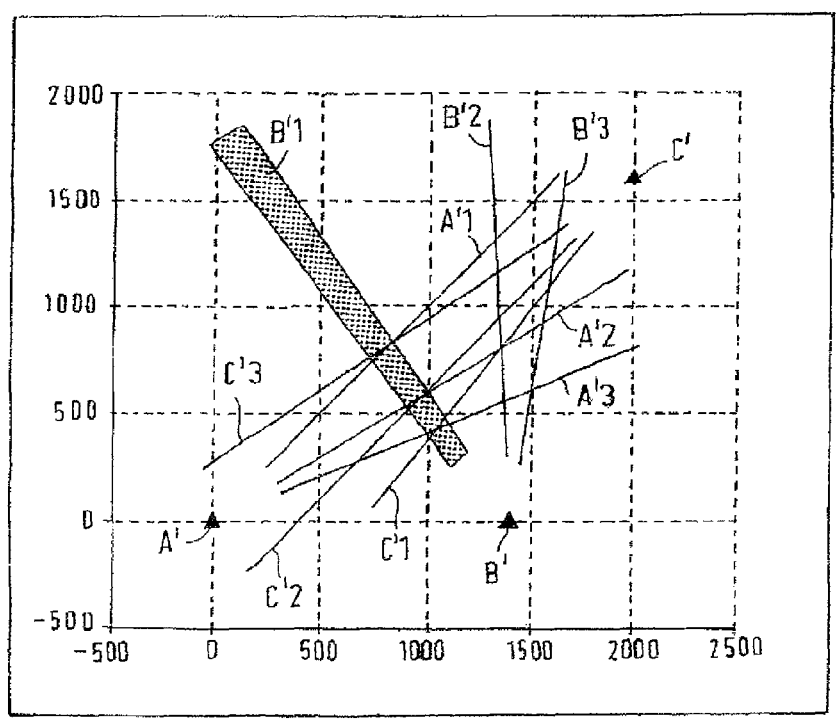
Prior Art  Fig. 2

|     | A'1 | A'2 | A'3 | B'1 | B'2 | B'3 | C'1 | C'2 | C'3 |
| --- | --- | --- | --- | --- | --- | --- | --- | --- | --- |
| A'1 | 0   | 0   | 0   | 1   | 1   | 1   | 0   | 0   | 1   |
| A'2 | 0   | 0   | 0   | 1   | 1   | 1   | 1   | 1   | 0   |
| A'3 | 0   | 0   | 0   | 1   | 1   | 1   | 1   | 1   | 0   |
| B'1 | 1   | 1   | 1   | 0   | 0   | 0   | 1   | 1   | 1   |
| B'2 | 1   | 1   | 1   | 0   | 0   | 0   | 1   | 1   | 1   |
| B'3 | 1   | 1   | 1   | 0   | 0   | 0   | 1   | 1   | 1   |
| C'1 | 0   | 1   | 1   | 1   | 1   | 1   | 0   | 0   | 0   |
| C'2 | 0   | 1   | 1   | 1   | 1   | 1   | 0   | 0   | 0   |
| C'3 | 1   | 0   | 0   | 1   | 1   | 1   | 0   | 0   | 0   |

METHOD FOR SURVEILLANCE OF SPACE/AIR SPACE

This is a U.S. National Stage of application No. PCT/EP2006/007127, filed on Jul. 20, 2006. Priority is claimed on that application and on the following application:
Country: Germany, Application No.: 10 2005 041 705.1
Filed: Sept. 2, 2005.

BACKGROUND OF THE INVENTION

The invention relates to a method for association of 2D measurements from a sensor system, in particular for air defense.

EP 0 205 794 A1 discloses a surveillance system such as this for space/airspace surveillance. The real targets which are produced as video signals by an IR position-finding appliance during each search cycle are preprocessed in a data preprocessing device, and are discriminated and stored in an IR signal processor on the basis of their elevation values and azimuth values. The real-target coordinates in elevation, azimuth and distance, as determined by the appliances, are supplied to a higher-level fire control facility.

A radar measurement device for airspace monitoring is disclosed in DE 1 057 788. A 2D pulse-Doppler radar is described in DE 36 88 935 T2. DE 39 26 216 A1 discloses a multifunction radar. A secondary radar system is published in DE 41 09 981 A1.

A method for airspace surveillance of a relatively large region with the aid of pulse surveillance radars has already been disclosed in DE-PS 977 646.

DE 198 56 231 A1 discloses a method for aircraft surveillance, which is carried out using satellites. DE 100 32 433 A1 also deals with a method for space surveillance. DE 36 37 129 C2 discloses a three-way DME system for attempting to find the position of an aircraft.

If the sensors and the fire control equipment are networked, they can interchange their current target status measurements (position and velocity) with one another and/or can send the measurements to a preferably central computer. In order to create the instantaneous air situation, the received signals from the respective fire control equipments are investigated to determine whether they originate from the same or from different targets. Once the measurements that have been received in a time interval have been associated, a decision is made as to how many targets have been recorded in an airspace, which and how many of them are new, and which and how many known targets have an updated state. In particular, it is difficult to associate targets that are flying physically closely together using known methods. Measurement errors relating to the position and velocity of a target are a major disturbance source for correct association. The errors generally occur during the measurement process or during a necessary time matching process, which is done by means of extrapolation to a common time, for comparison with other measurements. Measurement errors increase the probability of incorrect associations. The further aspect for errors occurs, as already mentioned, in the spatial resolution of the known 2D, 2.5D sensors which cannot resolve one of the three spatial dimensions at all, or can resolve it only inadequately. For example, in the case of a 2D search radar, only the range and azimuth of a target with respect to the sensor are measured, while in contrast there is no information about the elevation. In the case of 2.5D search radars, the elevation area of the target is restricted to an interval. In contrast, passive electro-optical sensors produce measurements of azimuth and elevation, but cannot measure the range to the target.

In order to allow the measurements to be compared, they must be converted to a common, higher-level coordinate system. A local 2D measurement can be transformed to a different three-dimensional coordinate system only by assuming the third dimension. This results in a further increase in the measurement inaccuracy, because of a high measurement uncertainty. Measurements such as these are in general distinguishable only with difficulty, thus exacerbating the association process.

The time required for association is a further factor, in addition to the technical problems relating to accuracy and resolution. In the case of large networked air-defense systems, which monitor an airspace with intensive targets, the association process leads to a computation complexity and time penalty which allows only a very low level of updating.

DE 44 39 742 C2 proposes a method for automatic combinational optimization of associations for tracking a plurality of moving objects. A new association matrix is generated on the basis of a more or less randomly selected, undefined, but valid association matrix. A check is then carried out to determine whether this matrix represents a better solution than the old association matrix. If this is the case, this matrix is adopted as the new starting point for a further search. The aim of this method is to avoid time-consuming searching and to achieve adequate quality.

SUMMARY OF THE INVENTION

In this context, the object of the invention is to specify a method which allows sufficiently accurate association of targets while minimizing the time required.

The invention is based on the idea of making use of the known geometry of the measurements in order to associate them with one another and in order to resolve ambiguities, with the 3D position of a target in space being determined at the same time by a spatial section.

The effectiveness of the method is based on the assumption that translation, rotation and scaling of each sensor are known with respect to a common coordinate system in which all the sensors in a system are located. This precondition can be considered as being satisfied at least when an airspace surveillance sensor has been set up, in particular the direction of north is defined and is horizontal, and its position has been determined, for example by means of GPS.

The method is based on the effect that the missing dimension can be interpreted as a measurement interval, so that a two-dimensional measurement in the higher-level system describes a 3D spatial curve along the missing dimension. At the time of the measurement, the target lies on this curve, but its 3D position is unknown. If a target is being observed by two 2D sensors, then the space curves intersect at the target location, provided there are no measurement errors. The method now makes use of this fact to solve the associate problem by projection of the signal from a fire control equipment into the local geometry of the sensors of the other fire control equipments.

The method comprises N−1 steps per measurement, where N is the number of sensors. In a first step, a type of master sensor is defined, and its space curve is calculated. The curve is then transferred into the geometry of another sensor, which is defined as a slave sensor. The space curves of the correspondence obtained in the previous step are then calculated and are transferred, together with the master curve, to the geometry of the next sensor, which is defined as a new slave sensor. If the new information can be used to resolve ambiguities from the first step, the relevant measurements are deleted from the association list. All the partners that are newly added with respect to the master measurement are recorded again. In the final step, the last remaining sensor is defined as a slave. The master and all the measurements associated with it from the previous slave sensors are transferred to the local geometry, and are compared with the measurements. After the association of the local measurement, a check is carried out to determine whether the master in each case has only a maximum of one associated measurement with the slave sensors. If this is not the case, the ambiguity at this time is resolved with the shortest distance of the respective measurement to the sensor. This completes the association with the master. All the associated measurements are stored and no longer need be taken into account for further analysis.

The same method is now applied to the first master sensor until all the measurements have been associated. A previous slave sensor is then defined as the new master, and the method is applied to the remaining targets.

The advantages of this method can be described as follows. The method allows unambiguous association of 2D and 2.5D measurements of a sensor system, with all the physically possible states being compared, and incorrect assumptions relating to the target position being avoided. Each measurement is associated with a maximum of one measurement from another sensor which, furthermore, is based on geometric conditions and therefore reduces the dependence of the decision on distance calculations. Furthermore, the association is carried out individually for each measurement, so that there is no longer any need to calculate out all the possible correspondences since there are no comparisons with already associated measurements. This reduces the computation complexity and the time required. The method complexity is linear and is particularly suitable for scenarios with a large number of sensors and targets. The method covers all possible sensor types, both search radars and electro-optical sensors or IR sensors. The greater the number of sensors that yield measurements, the more reliable and less ambiguous will be the result, because of the increase in spatial information. The spatial section results in the 3D position of the target being known/identified even during the association process.

Figure 5:
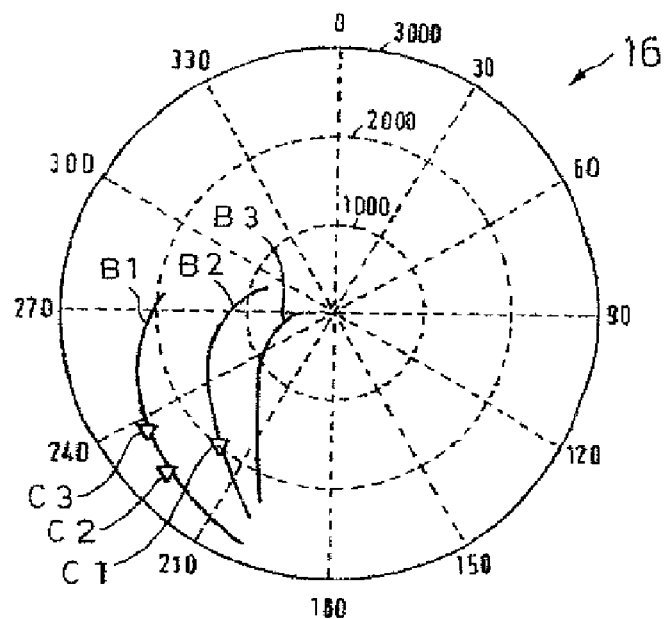
Figure 6:
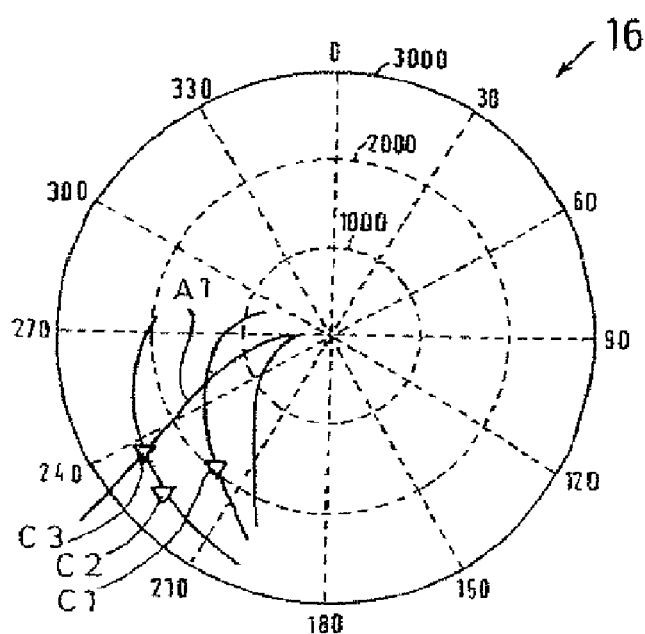
Figure 7:
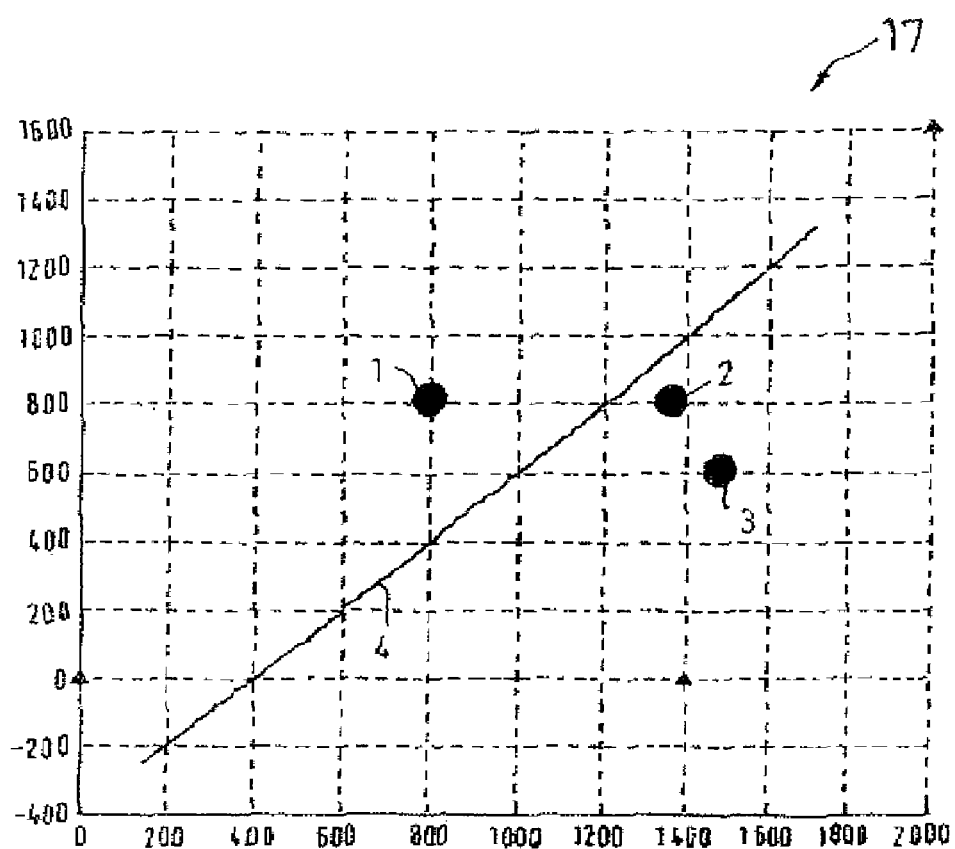

The invention will be explained in more detail against the background of the prior art and with reference to one exemplary embodiment and the drawing, in which:

FIG. 1 shows an illustration of the measurements on the display of three 2D search radar sensors in a networked air-defense system according to the prior art, FIG. 2 shows an illustration of the displays from FIG. 1 on the X-Y plane of the higher-level system according to prior art, FIG. 3 shows an illustration of the association matrix resulting from FIG. 2, FIG. 4 shows a projection of a space curve of the first search radar into the local geometry of the second search radar, FIG. 5 shows a projection of the space curve of the second search radar into the local geometry of the third sensor, FIG. 6 shows a projection of the space curve of the first search radar into the projection shown in FIG. 5, and FIG. 7 shows a target position, defined from the associations, on the X-Y plane of the higher-level coordinate system.

DETAILED DESCRIPTION OF THE INVENTION

FIG. 1 shows a display 10 of a first search radar sensor A and a further display 11 of a second search radar sensor B, as well as a third display 12 of a third search radar sensor C according to the prior art. The range (in meters) and direction (in degrees) are shown on the display 10. Three targets are indicated, as A1-A3. Three targets are indicated as B1-B3 on the display 11 of the second search radar sensor B, and three targets are indicated as C1-C3 on the display 12 of the third search radar sensor C.

For correlation purposes, the measurements are converted to the geometry 13 of the higher-level Cartesian coordinate system. The position of each of the sensors A, B, C is required for this purpose.

FIG. 2 shows the illustration, as known from the prior art, of the measurement from FIG. 1 in the higher-level system. The radar positions which result in the display/geometries of the displays 10 to 12 are identified by A, B, C. In this case, the measurements are mapped on a straight line, in each case pointing from the respective radar position A, B, C to the targets A1'-A3', B1'-B3' and C1'-C3'. In particular, the straight line or track B1' indicates the additional influence of the measurement error on the association according to the prior art. FIG. 3 uses an association matrix 14 to show that unambiguous association of a measurement is never possible. Each measurement of A' fits each measurement of B. Furthermore, the possible association of C' with the two sensors A', B' is a further fact.

Based on the displays 10 to 12 shown in FIG. 1, a space curve A1 is therefore calculated in the local sensor coordinate system of the sensor A and is now converted to the display 15, that is to say to the local geometry of the radar B, using the novel method in FIG. 4. In this case, all the possible measurements for the association with A1 are registered. In the example, all the measurements by B (B1, B2, B3) are association candidates for A1.

Unambiguous association is therefore impossible, so that all the measurements of B1 must be considered subsequently, with only measurements along the curve A1 being possible association candidates. There is no need to compare measurements outside the relevant range and azimuth area described by the curve A1. The space curve A1 therefore restricts the search area for association candidates, and thus reduces the number of comparisons.

In order to resolve the ambiguity, the space curves A1 and B1-B3 from the associated measurements by the sensors A, B are projected in a further step into the geometry 16 of the sensor C. The ambiguities are now resolved here.

In the example shown in FIG. 4, the projection of the space curves B1-B3 into the geometry C results in further ambiguities. B1 can be associated not only with C2 but also with C3. B3 cannot be associated with any measurement by C. However, the pair B2-C1 has an unambiguous association. The new ambiguities are now transferred by projection of the space curve A1 into the local geometry of C (FIG. 6). A1 intersects B1 at the measurement C3. These three values are associated with one another. At the same time, both the ambiguity problem of A1 with B1-B3 and that of B1 with C2 and C3 is resolved.

The method also simplifies the association for A2 and A3, which can be determined analogously. The already associated measurements C3 and B1 are no longer considered for this subsequent association.

The intersection of the space curves results in a further advantage. Since the 3D position of every point on the space curve is known, the associated elevation can be read directly from the point at which the local measurement touches the curve. The position of the target is therefore defined in the higher-level coordinate system.

The following associations, as illustrated in FIG. 7, are obtained as the solution for the described example.
Target 1: A1-B1-C3
Target 2: A2-B2-C1
Target 3: A3-B3
Target 4: C2.

The air picture (geometry 17 (≙ geometry 13) of the higher-level Cartesian coordinate system) therefore contains four targets, three of which are being monitored by at least two of the sensors at the same time, so that a 3D position can be calculated. Target 1 and target 2 are observed by all the sensors A, B, C, while the target 3 can be seen only by A and B. Target 4 is not measured by A and B so that its existence was discovered only by correct association of the measurement.

The invention claimed is:

1. A method for automatic combinational optimization of target determination of a plurality of moving objects with assistance of a plurality of sensors and their displays, comprising the steps of:
   (a) defining a first sensor (A) as a master sensor and calculating a master space curve (A1) of the first sensor;
   (b) transferring the space curve to a display of a second sensor (B) defined as a slave sensor, the space curve being converted in the display of the slave sensor (B), wherein measurements outside of a relevant, distance and azimuth range that describe the space curve (A1) are not considered;
   (c) defining a further sensor (c) as a new slave, in which the space curve (B1-B3) of a correspondence of measurements obtained in the previous step is calculated and transferred, together with the master space curve (A1), to a display of the new slave sensor (C), and the curve is taken into account as a new display;
   (d) repeating steps (a)-(c) at least until, in a final step, a last (N) remaining sensor is defined as a slave, the master space curve (A1) and all measurements associated with the master space curve (A1) from the previous slave sensors (B, C . . . N−1) being transferred to the local display of the last (N) slave sensor; and
   (e) displaying the local display of the last slave sensor as an aerial view of a superordinated Cartesian coordinate system of an air space monitoring sensor.

2. The method as defined in claim 1, including, when new information resolves ambiguities from the previous step, deleting the relevant measurements from an association list, although all the new measurements to be added are recorded.

3. The method as defined in claim 1, including, after the association of the local measurement, carrying out a check to determine whether the master sensor in each case has only a maximum of one associated measurement from the slave sensors, wherein, if this is not the case, the ambiguity at this time is resolved with the shortest distance of the respective measurement to the slave sensor, thus completing the association with the master sensor.

4. The method as defined in claim 1, including, once the association of the first master sensor (A) has been carried out, defining a next slave sensor as the master and repeating the steps for the remaining targets.

5. The method as defined in claim 1, including, for correlation introducing the measurements of the master sensor into the geometry of the respective slave sensor.

6. The method as defined in claim 1, wherein a 3D situation is known by means of an intersection of the space curves (A1, B1-B3, C1-C3) from each point on the space curve (A1, B1-B3, C1-C3) by which means the missing dimensions (elevation/distance) can be read directly from the point at which the local measurement touches the curve (A1, B1-B3, C1-C3).

7. The method as defined in claim 5, including reducing complexity of the association and computation complexity by restricting the number of correlations to candidates along the space curves which have been projected into the geometry of the respective slave sensor.

* * * * *